United States Patent [19]
Bornhorst et al.

[11] Patent Number: 5,865,070
[45] Date of Patent: Feb. 2, 1999

[54] ADJUSTABLE STROKE CONNECTION

[75] Inventors: John B. Bornhorst, New Bremen; Richard J. Oen, Wapakoneta; Edward A. Daniel, Ft. Loramie, all of Ohio

[73] Assignee: The Minster Machine Company, Minster, Ohio

[21] Appl. No.: 738,843

[22] Filed: Oct. 28, 1996

Related U.S. Application Data

[60] Provisional application No. 60/006,601 Nov. 13, 1995.

[51] Int. Cl.$^6$ .................................................. F16C 3/04
[52] U.S. Cl. ........................ 74/603; 100/257; 74/595; 74/600
[58] Field of Search ............................ 74/600, 603, 595; 100/257, 282, 216

[56] References Cited

U.S. PATENT DOCUMENTS

| | | |
|---|---|---|
| 3,180,178 | 4/1965 | Brown et al. . |
| 3,547,244 | 12/1970 | Fergle et al. . |
| 3,765,266 | 10/1973 | Carlise . |
| 3,858,432 | 1/1975 | Voorhees et al. . |
| 4,156,387 | 5/1979 | Portmann ................................. 74/603 |
| 4,160,409 | 7/1979 | Portmann ............................... 74/603 X |
| 4,319,498 | 3/1982 | McWhorter ................................. 74/595 |
| 4,350,090 | 9/1982 | Busse et al. ............................. 100/216 |
| 4,375,785 | 3/1983 | Schoch et al. .......................... 74/606 A |
| 4,785,732 | 11/1988 | Czapka et al. ........................... 100/257 |
| 5,189,928 | 3/1993 | Ontrop et al. .............................. 74/603 |
| 5,239,893 | 8/1993 | Maruno . |
| 5,307,709 | 5/1994 | Bareis et al. . |
| 5,351,576 | 10/1994 | Matsui et al. . |

FOREIGN PATENT DOCUMENTS

| | | |
|---|---|---|
| 0 250 871 A1 | 1/1988 | European Pat. Off. . |
| 2160613 A | 12/1985 | United Kingdom ..................... 74/600 |

*Primary Examiner*—Vinh T. Luong
*Attorney, Agent, or Firm*—Randall J. Knuth

[57] ABSTRACT

An adjustment stroke connection for a mechanical press with an eccentric bushing is disposed within a press connection member with a second eccentric member disposed within the eccentric bushing. A rotatable crankshaft is connected to the second eccentric member. A mechanism is included for connecting the eccentric bushing with the press connection member to prevent rotation therebetween and permitting rotation of the second eccentric member with the eccentric bushing whereby rotation of the crankshaft, when the mechanism is activated, causes a press stroke adjustment.

9 Claims, 7 Drawing Sheets

ADJUSTABLE STROKE CONNECTION

This application is a provisional Application Ser. No. 60/006,601 filed Nov. 13, 1995.

BACKGROUND OF THE INVENTION

1. Field of the Invention.

The present invention relates to mechanical stamping and drawing presses, and, more particularly, to apparatus for an adjustable stroke connection for adjusting the stroke length of the press slide.

2. Description of the Related Art.

In mechanical presses, it is often desirable to adjust or change the stroke length of a reciprocating member, for example the slide, to which stamping tooling is installed. In some prior art toothed adjustment systems, there is a tendency for the system parts to wear after a certain period of operation time. It would be desirable to provide an apparatus or system which may be utilized to quickly, easily, and accurately adjust the stroke length of the slide or other parts.

SUMMARY OF THE INVENTION

The present invention provides a dual eccentric adjustable stroke connection system for use in changing the stroke length of the slide or other member of a mechanical press.

An eccentric on a rotatable crankshaft is supplied with an eccentric bushing disposed thereon. A press connection member, such as a connecting rod or link, is attached about the eccentric bushing. During normal operation, there is relative movement between the eccentric bushing and connecting member or arm to thereby cause reciprocation of the press slide. During stroke adjustment, pressurized oil is communicated between the eccentric bushing and crankshaft eccentric, thereby relieving the press fit or interference fit therebetween, and causing the eccentric bushing to expand and form a temporary press fit connection with the connecting arm. At this time, crankshaft may be rotated, along with its eccentric, to thereby change the position of the eccentric within the eccentric bushing. This causes a change of stroke length. The oil pressure is then relieved thereby causing the eccentric bushing to contract and again form a press fit or interference fit with the crankshaft eccentric and release the temporary press fit connection between the outside of the eccentric bushing and connection member or arm. After such high oil pressure has been reduced, normal press operations may proceed.

The invention comprises, in one form thereof, a mechanical press having, a press connection member, an eccentric bushing disposed within the press connection member, and a second eccentric member disposed within the eccentric bushing, the second eccentric member releasably connectable with the eccentric bushing. A rotatable crankshaft is connected to the second eccentric member. The invention includes means for connecting the eccentric bushing with the press connection member to prevent rotation therebetween and permitting rotation of the second eccentric member within the eccentric bushing whereby rotation of the crankshaft, when the means is activated, then causes a press stroke adjustment. The invention also includes at least one high coefficient of friction seal, disposed between the second eccentric member and the eccentric bushing, where the high friction seal prevents rotation of the eccentric bushing relative to the second eccentric member prior to creation of the temporary press fit connection.

The invention comprises, in another form thereof, a fluid pressure means for connecting the eccentric bushing with the press connection member to prevent rotation therebetween and permitting rotation of the second eccentric member within the eccentric bushing. The fluid pressure means includes fluid passageways through the crankshaft in communication with a fluid pressure intensifier means for increasing fluid pressure through the crankshaft passageways. In one form of the invention the intensifier may include a movable piston to increase the fluid pressure within the crankshaft passageways.

An advantage of the present invention is that a mechanical press may now include a simple and compact stroke adjustment connection operated by fluid pressure. Prior stroke adjustment connections utilized keys and/or gearing between the crankshaft and various eccentrics. The present invention utilizes a connection that is simple in design and vastly reduces the number of parts necessary for a stroke adjustment mechanism.

Another advantage of the present invention is that a significant reduction in costs is obtained along with increasing the functionality of the press with a simple stroke adjustment connection. Additionally, maintenance costs for adjustment and replacement parts, as compared to prior adjustable stroke connections, are reduced.

Another advantage of the present invention is that of a fluid intensifier which achieves a high ratio of fluid intensification while disposed within the press crank shaft. The new and novel fluid intensifier of the present invention is simple in construction and operation, thereby requiring simple rotary sealing arrangements.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Figure 1:
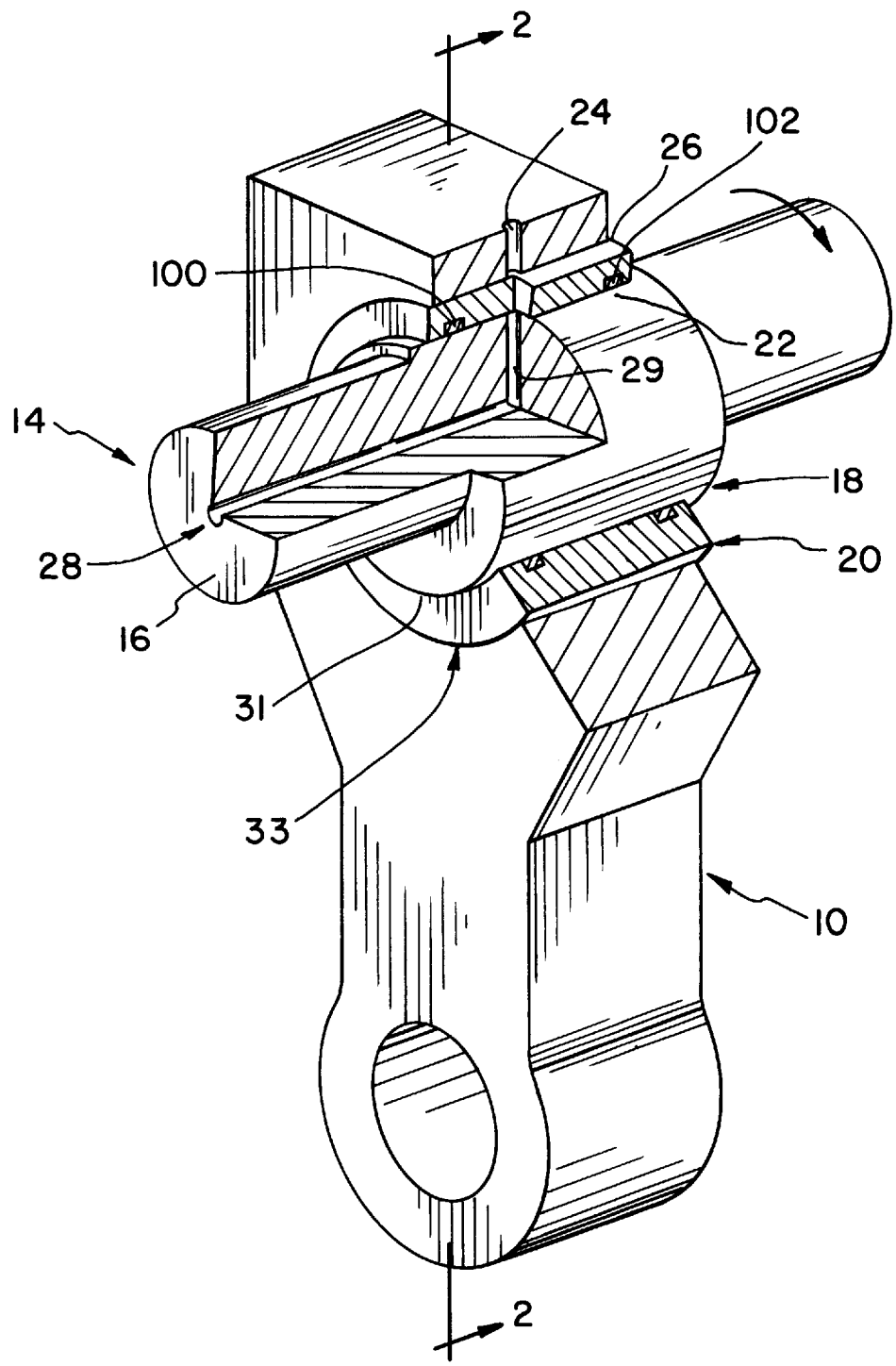
FIG. 1 is a schematic, perspective view in partial cut away of a portion of the crankshaft and slide connection.

Corresponding reference characters indicate corresponding parts throughout the several views. Although the drawings represent embodiments of the invention, the drawings are not necessarily to scale and certain features may be exaggerated or omitted in order to better illustrate and explain the present invention.

DESCRIPTION OF THE EMBODIMENTS

Figure 9:
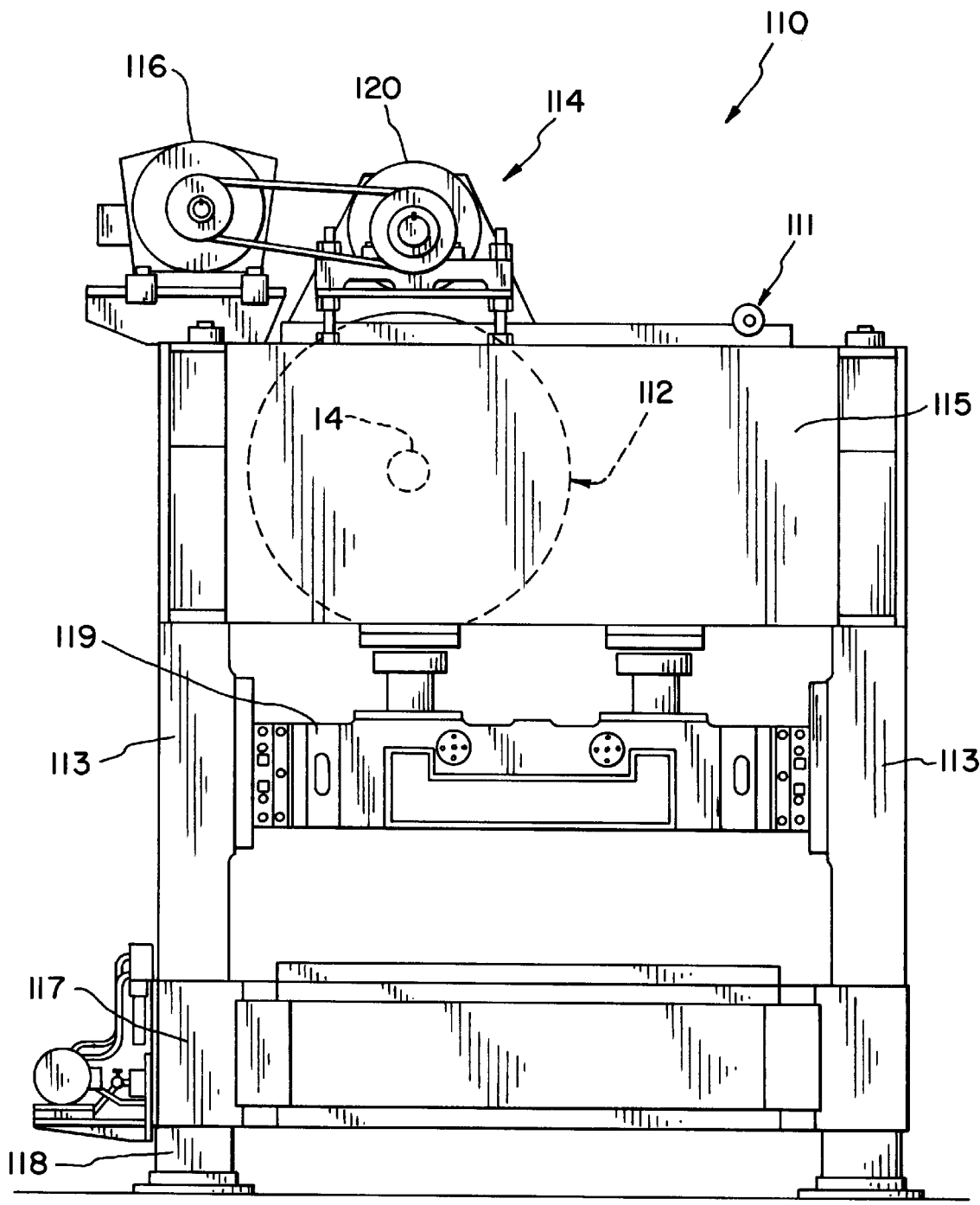
FIG. 9 is an elevational view of a typical mechanical press utilizing the present invention.

The adjustable stroke connection of the present invention is ideally suited for a wide assortment of configurations of mechanical, stamping presses. As is conventional, a mechanical press 110 (FIG. 9) typically includes a crown portion 115, a bed portion 117 having a bolster assembly connected thereto, and uprights 113 connecting crown portion 115 with the bed portion 117. Uprights 113 are connected to or integral with the underside of the crown and the upper side of the bed. A slide 119 is positioned between uprights 113 for guided, reciprocating movement relative to the bed. Tie rods (not shown), which extend through the crown, uprights and bed portion, which are attached at each end with tie rod nuts. Leg members 118 are formed as an extension of the bed and are generally mounted on the shop floor by means of shock absorbing pads.

In order to power the reciprocating motion of the slide 119, a drive mechanism 114 for the press is provided. A suitable mechanism includes a drive motor 116 attached by means of a belt to an auxiliary flywheel 120 attached to crown 115. The auxiliary flywheel 120 is connected to a main flywheel 112, which in turn is selectively engaged by the clutch of the combination clutch/brake to power the rotation of the press crankshaft 14, which in turn effects slide motion via connections extending between the slide and crankshaft. This description of press 110 and its drive mechanism is merely illustrative. A wide variety of mechanical presses are well known in the art, and the instant invention can be utilized with any mechanical press that utilizes a crankshaft type device to achieve reciprocating motion of a press component. An example of a mechanical press is disclosed in U.S. Pat. No. 5,189,928 entitled "ADJUSTABLE STROKE PUNCH PRESS", which patent is incorporated herein by reference.

Referring now to FIG. 1, there is schematically shown in perspective view a portion of the crankshaft, its associated eccentric bushing, and the connection which is powered by crankshaft rotation. The connection may be formed of a bottom portion and a cap, and the bottom portion of connection member 10 would typically be attached in a suitable fashion to the press slide. The crankshaft 14 includes a cylindrical main portion 16 axially centered on the crankshaft axis of rotation and a second eccentric member such as a cylindrical eccentric 18 rotatably fixed thereto or integrally formed therewith. Although only one crankshaft eccentric is shown, multiple eccentrics would be provided along the axial length of crankshaft 14 to cooperate with additional connections which are not shown.

Figure 2A:
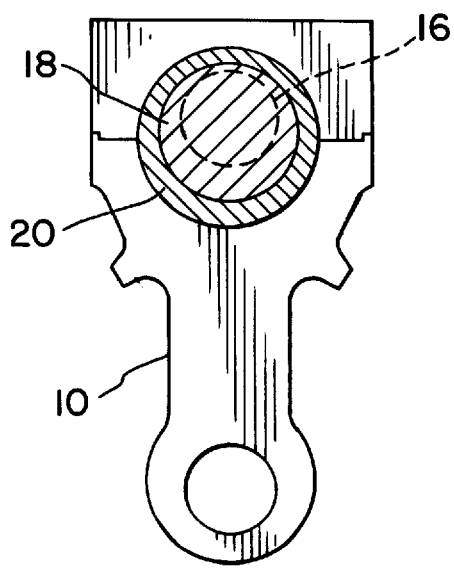
FIGS. 2A and 2B are two cross-sectional views along the line 2—2 of FIG. 1 of the crankshaft and eccentric bushing, at maximum and minimum stroke positions respectively, wherein the connection is shown in elevational view, and wherein the oil conduits for lubrication and crankshaft adjustment are not shown.
Figure 2B:
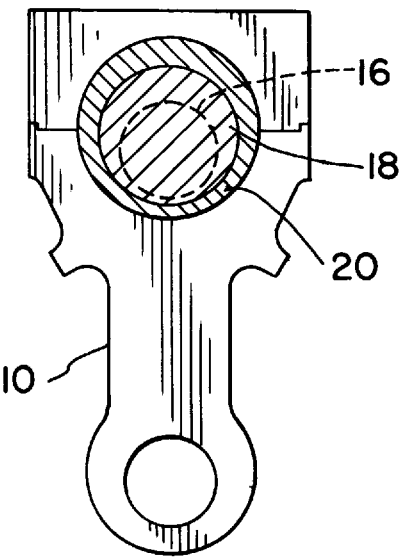
Figure 3:
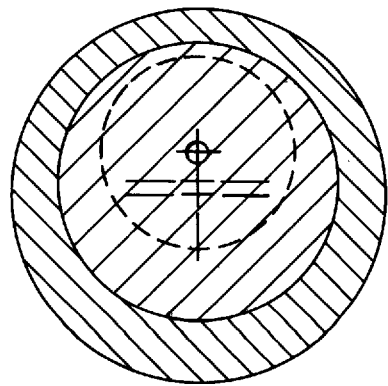
FIG. 3 is an enlarged cross sectional view of the crankshaft and eccentric bushing of FIG. 2A.
Figure 4A:
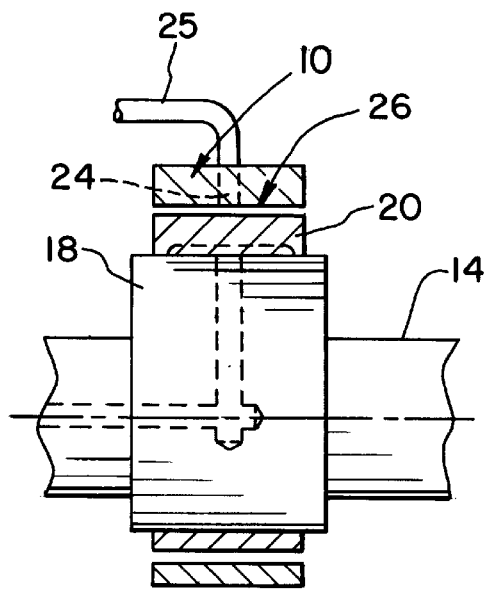
FIGS. 4A and 4B are schematic, axial cross-sectional views of the invention along the crankshaft axis at separate times of operation, namely during normal stamping operations and during stroke length/eccentric adjustment, respectively.

Ringing crankshaft eccentric 18 is a bronze eccentric bushing 20. FIGS. 2A, 2B and 3 better illustrate the configuration of these components, wherein crankshaft main portion 16 is shown in dashed lines. During normal press operation, as crankshaft 14 rotates, the eccentric bushing 20 is held in place on crankshaft eccentric 18 (i.e., rotates therewith) by a press fit or interference fit around the crankshaft eccentric circumference at 22 that is sufficient to transmit the torque required to accomplish the stamping or forming operation. Oil is supplied to lubricate the rotation of eccentric bushing 20 relative to connection 10 For example, oil passes through the top of the connection or the connection cap at conduit 24 and into a 0.003" to 0.005" radial clearance 26 to provide an oil film on which eccentric bushing 20 rotates FIG. 4A shows how oil, such as at 125 p.s.i., can be delivered through hose 25 and conduit 24 to radial/running clearance 26 to lubricate the connection movement. At this point of operation, the conduits in FIG. 4A indicated in dashed lines within crankshaft 14 and eccentric 18 are not being used in a manner to effect stroke adjustment described further below. As crankshaft 14 and its co-rotating eccentric bushing 20 rotate relative to connection 10, the connection 10 moves up and down to effect a reciprocating motion of slide 119.

Figure 4B:
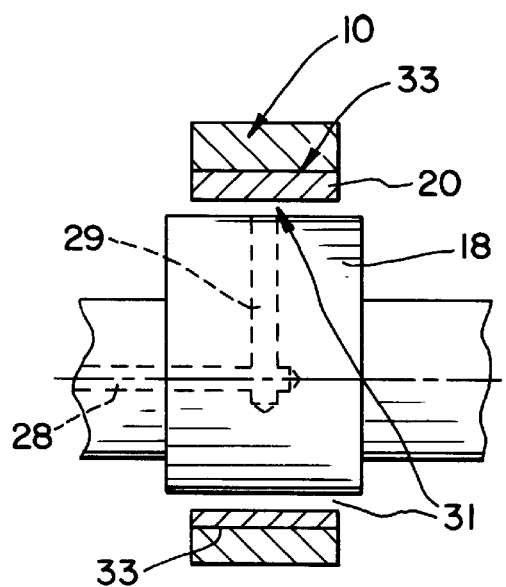

When a change or adjustment in the stroke of slide 119 is desired, rotation of crankshaft 14, and therefore motion of the slide, is stopped, and the oil supply through conduit 24 at the top of connection 10 is halted. Then, high pressure oil is supplied through crankshaft 24 such as through axial bore 28 and one or more cross bores 29, to the inside diameter of eccentric bashing 20. The high pressure oil is expected to be, but not limited to between 7,000 p.s.i. to 10,000 p.s.i., and is distributed circumferentially around crankshaft eccentric 18. Seals 100, 102 may be provided, such as along the axial edges at the inside diameter of bushing 20, to prevent escape of the high pressure oil. The high pressure oil tends to circularly expand bushing 20 to relieve the press fit between crankshaft eccentric 18 and eccentric bushing 20. The high pressure oil in effect creates a small radial clearance between eccentric 20 and crankshaft eccentric 18 indicated at 31, and creates a temporary press fit or interference fit situation at 33, circumferentially between eccentric bushing 20 and connection 10. (See also FIG. 4B) Lubricated, radial clearance 31 allows crankshaft 14 to rotate relative to eccentric bushing 20, which, due to its temporary press fit with connection member 10 does not rotate. As crankshaft 14 rotates, the crankshaft main portion 16 shifts into a different position relative to the eccentric bushing 20, which in turn effectively changes the stroke length of connection 10 to a desired length. When the adjustment is completed, the high pressure oil at 31 supplied through crankshaft 14 is halted, allowing the eccentric bushing 20, due to the resiliency of its metal construction, to return to its press fit with the crankshaft eccentric (second eccentric member 18) to again allow rotation of the crankshaft to reciprocate the connection and thereby continue stamping operations.

FIGS. 2A and 2B disclose how a rotation of crankshaft 14 along with eccentric bushing 20 through 180° achieves, as shown, a 2.5" stroke length. Naturally, other stroke lengths are possible within the scope of the invention.

Figure 5:
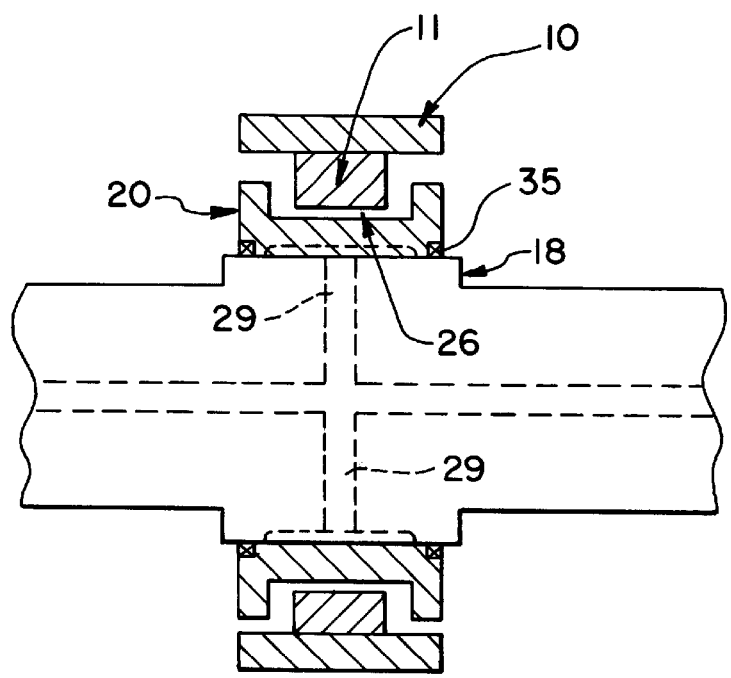
FIG. 5 is an axial, cross-sectional view of an alternate embodiment of the invention along the crankshaft axis showing an additional connection bushing between the eccentric bushing and the connection, and with an oil conduit for crankshaft adjustment shown.

FIG. 5 discloses an alternate embodiment of the invention, and this embodiment is shown during stamping operations. In this embodiment, an additional connection bushing 11 is interposed between connection 10 and bushing 20, and connection bushing 11 fits in a circumferential groove provided in the radially outer portion of eccentric bushing 20. Oil can be introduced into radial clearance 26 to furnish an oil film which facilitates free rotation of the crankshaft and its eccentric bushing relative to connection 10 and its associated bushing 11. In this embodiment, seals 35 prevent escape of high pressure oil from between crankshaft eccentric 18 and eccentric bushing 20. During stroke adjustment, high pressure oil is supplied through multiple cross bores 29 fed by an axial bore 28. Axial bore 28 extends through the crankshaft to each connection further along the axial length of the crankshaft.

To aid in preventing eccentric bushing 20 from possibly "egg-shaping" and developing uneven stresses when it is expanded to relieve its press fit with crankshaft eccentric 18 as described above, a variety of eccentric bushing shapes may possibly be employed.

Figure 6A:
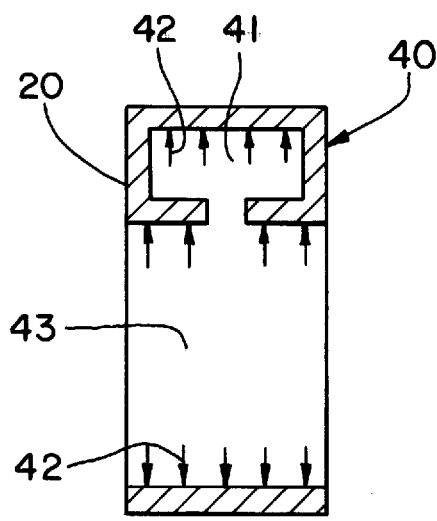
FIG. 6A is an axial, cross-sectional view of a first eccentric bushing.
Figure 6B:
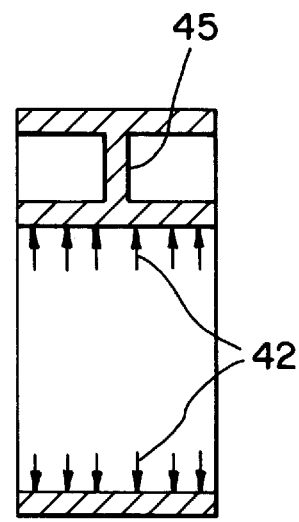
FIGS. 6B and 6C are an axial cross-sectional view and a side view, respectively, of another eccentric bushing.
Figure 6C:
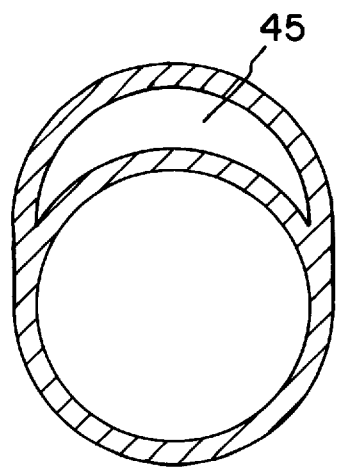
Figure 6D:
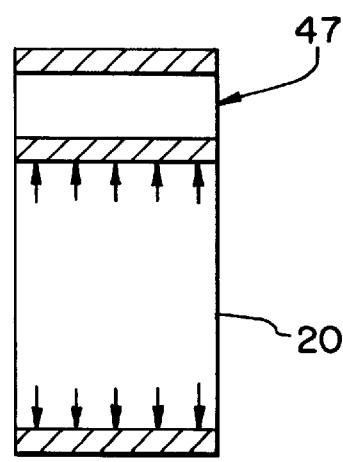
FIG. 6D is an axial, cross-sectional view of still another eccentric bushing.

For example, FIG. 6A is an axial, cross-sectional view of an eccentric bushing 20 in which the eccentric lobe portion 40 includes an internal cavity 41 in fluid communication with the eccentric bushing internal opening 43 which receives crankshaft eccentric 18. When the high pressure oil is introduced circumferentially around the crankshaft eccentric, the high pressure oil provides a force directed radially outwardly (as indicated by the arrows 42), and the force also acts within lobe cavity 41 as shown. FIG. 6B is a cross-sectional view, conceptually similar to the view of FIG. 6A, in which the outer lobe portion has an I-beam type configuration with a central rib 45. The forces produced by the high pressure oil are again indicated at. 42. FIG. 6C discloses the eccentric bushing of FIG. 6B in side view wherein the eccentric lobe is shown as including rib 45 recessed from the axial edges of the eccentric bushing. FIG. 6D discloses still another embodiment in axial cross-sectional view, wherein the eccentric lobe 47 of the eccentric bushing 20 is hollow.

Figure 7:
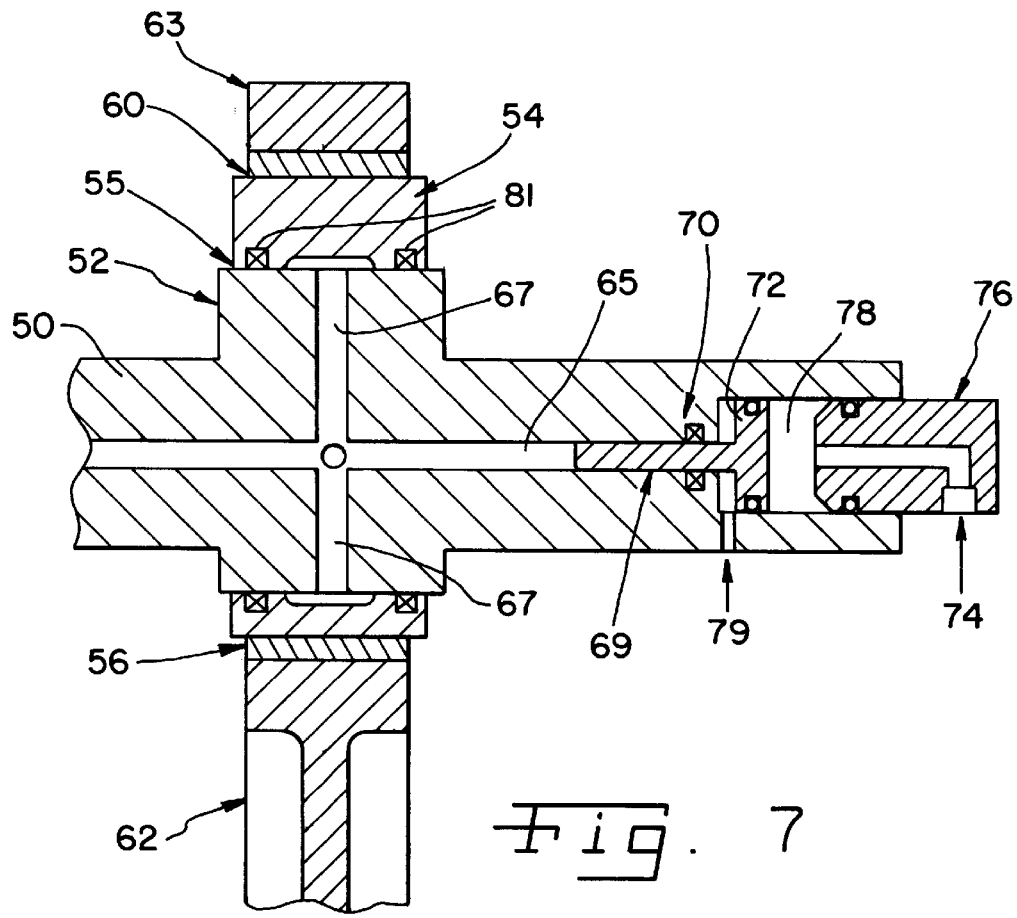
FIG. 7 is an axial, cross-sectional view of an embodiment of the present invention in which a suitable method of supplying high pressure oil to the crankshaft without a high pressure rotary union is shown.

Referring now to FIG. 7, there is shown still another aspect of the present invention which allows a conventional rotary union, as opposed to a special high pressure rotary union, to be used to introduce high pressure oil used for expansion of the eccentric bushing. The majority of the embodiment shown in FIG. 7 is conceptually similar to the embodiments described above. A cylindrical crankshaft eccentric 52 is integral with crankshaft main portion 50 and ringed by an eccentric bushing 54 which is press fit at 55 on eccentric 52. A connection bushing 56 rings eccentric bushing 54 and is provided with a small radial clearance at 60. Connection bushing 56 is press fit within an opening provided between connection cap 63 and connection bottom 62, which is attached to the press slide.

Axially extending through crankshaft main portion 50 is bore 65 from which branch off cross bores 67 radially extending through crankshaft eccentric 52. Axial bore 65 extends to the left in FIG. 7 toward other connections. To realize the high pressure oil used to expand eccentric bushing 54 without requiring that oil at these high pressures be introduced through a rotary union into the crankshaft, an intensifier with a 10:1 (or other) ratio is provided. Within the end of axial bore 65 is an intensifier rod or plunger 69 which is sealed by seal 70 seated in an internal groove of the crankshaft. Alternatively, the seal could be mounted on plunger 69. Plunger 69 ends at a circumferentially sealed piston 72. Oil, for example at 1,000 p.s.i., passes from 74 into rotary union 76 and into chamber 78 where it acts against piston 72 to force plunger 69 to move to the left. During plunger movement, air passes through vent 79.

As plunger 69 has a cross-sectional area one-tenth or other fraction of the cross-sectional area of piston 72, oil already within axial bore 65 and cross bores 67 is raised to a pressure of about 10,000 p.s.i. by piston movement. The piston and plunger are designed so as to have sufficient stroke to allow enough oil to be displaced to furnish expansion of the eccentric bushings of all of the connections. When high pressure oil within cross bores 67 moves into the inner-diameter cavity of eccentric bushing 54 to radially expand the bushing, seals 81 prevent the oil from escaping or leaking from the closed system.

Figure 8:
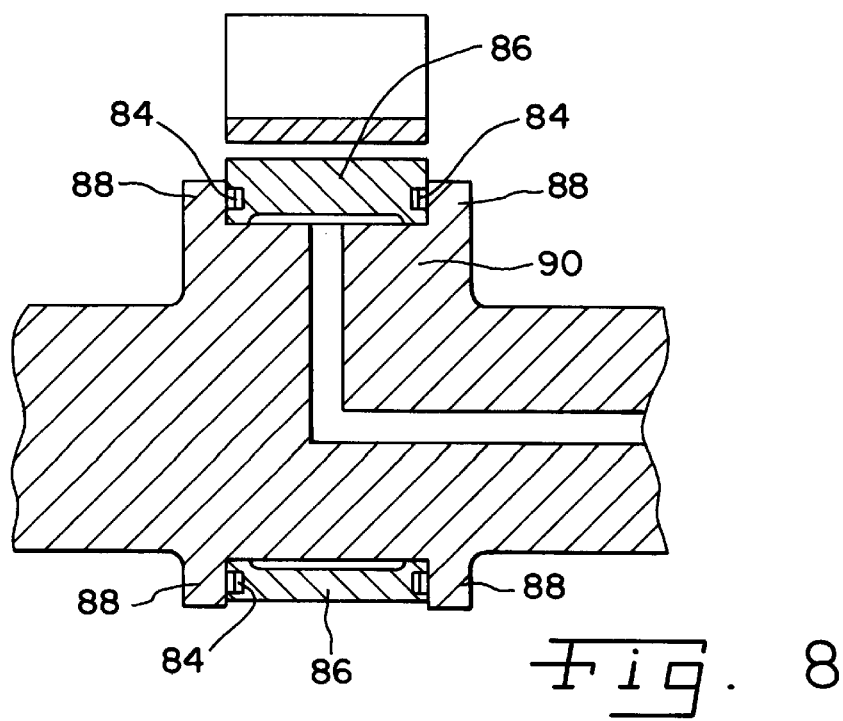
FIG. 8 is a schematic, partial cross-sectional view of a second seal configuration for sealing high pressure oil between the eccentric bushing and the crankshaft eccentric.

FIG. 8 is a partial, axial cross-sectional view of another method of sealing high pressure oil used to expand the eccentric bushing. In this embodiment, O-ring face seals 84 mounted on eccentric bushing 86 cooperate with radially aligned walls of ribs 88 projecting from crankshaft eccentric 90. Or, the seals could be provided on ribs 88 to protect against oil leakage. Other sealing configurations could also be employed within the scope of this invention.

The present invention includes two seals 100 and 102 (FIG. 1 and 10) made of a high coefficient of friction material which, when pressurized, creates a holding force or mechanism such that both the eccentric bushing 20 and second eccentric member 18 lock together until there is a press fit or interference fit created in clearance 26, located between connection member 10 and eccentric bushing 20.

Clutch torque, during rotation of crankshaft 14 will have to overcome the high coefficient of friction of this feature thereby created between the eccentric member 18 and eccentric bushing 20. This feature allows multiple eccentrics to displace at the same time with the same angle, without any additional mechanical teeth, sprockets, or other mechanisms to ensure proper timing or displacement therebetween. This sealing arrangement, with a high coefficient of friction, further reduces parts and simplifies the design. There are no other mechanical parts necessary to hold the position of multiple eccentrics relative to each other, so that the slide remains parallel after the press stroke change is completed.

An additional feature of the invention is that the same adjustable stroke connection may be utilized between the crankshaft and a balancer, thereby press balance may be maintained. Therefore the types of connection members utilizable with the present invention may be those of a normal connection arm or other link to a press part, such as a dynamic balancer.

Although the adjustable stroke mechanism of the present invention utilizes a single oil passageway through the crankshaft, it may be possible to have two different oil passageways coming from opposite sides, one to operate the adjustable stroke connection mechanism of the present invention related to slides, and the other passageway operating stroke adjustment for a balancing arrangement.

Figure 10:
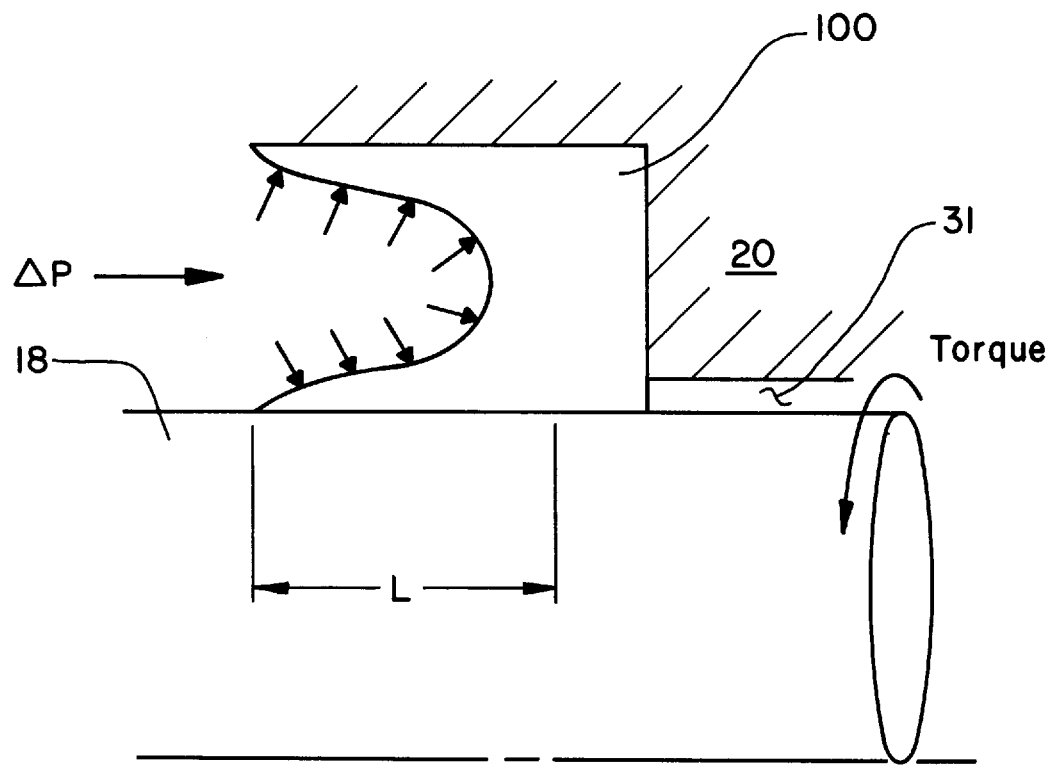
FIG. 10 is a schematic, cross-sectional view of one of the U-shaped seals of the present invention.

One type of seal found to be useful in the present invention is that of a U-type seal. This type of seal operates by the action of the internal fluid pressure spreading the lips of the seal. This movement creates a braking force between the eccentrics and journal which allows a clamping force to be developed. It has been found that a U-cup or U-shaped seal operates better than any other type of seal so far utilized. FIG. 10 shows a typical U-shaped seal (100,102) while pressure is applied between the two eccentric members. The clamping force increases with pressure. The holding force therefore can be easily manipulated for whatever torque is required by the device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A mechanical press comprising:
   a press connection member;
   an eccentric bushing disposed within said press connection member;
   a second eccentric member disposed within said eccentric bushing creating an interface therebetween said second eccentric member releasably connectable with said eccentric bushing;
   a rotatable crankshaft connected to said second eccentric member; and
   means for connecting said eccentric bushing with said press connection member by a temporary press fit to prevent rotation therebetween whereby rotation of said crankshaft when said means is activated then causes a press stroke adjustment.

2. The press of claim 1 in which said connecting means comprises fluid pressure applied to the interface between said second eccentric member and said eccentric bushing whereby such pressure permits relative rotation between said second eccentric member and said eccentric bushing.

3. The press of claim 1 in which said connecting means comprises fluid pressure applied to the interface between said second eccentric member and said eccentric bushing causes said eccentric bushing and said press connection to connect together by a temporary press fit connection.

4. The press of claim 3 in which said means operates through said crankshaft.

5. The press of claim 3 further comprising at least one friction seal disposed between said second eccentric member and said eccentric bushing whereby said friction seal prevents rotation of said eccentric bushing relative to said second eccentric member prior to creation of said temporary press fit connection.

6. The press of claim 5 in which said friction seal comprises a U-shaped seal.

7. The press of claim 1 in which said means operates through said crankshaft.

8. The press of claim 1 in which said eccentric bushing includes an internal cavity in communication with said second eccentric member.

9. The press of claim 1 in which said eccentric bushing includes an I-beam rib in cross-section.

* * * * *